INVENTORS.
JOSEPH RYGELIS.
BY GEORGE C. MUELLER.

ATTORNEYS.

United States Patent Office 2,971,390
Patented Feb. 14, 1961

2,971,390
MEANS FOR IMPOSING PRESSURE ON TOROID DISCS OF VARIABLE TRANSMISSIONS

Joseph Rygelis, Monroe, Conn., and George C. Mueller, Walled Lake, Mich., assignors to Avco Corporation, Stratford, Conn., a corporation of Delaware Filed Aug. 18, 1959, Ser. No. 834,429

3 Claims. (Cl. 74—200)

This invention relates to a resilient spring mounting for toroidal discs in a variable ratio type of transmission. More particularly, the invention is directed to an axial spring mounting for such discs which enables the exertion of a constant, uniform force against the intermediate rollers between the discs in such manner that the drive is smooth and effective despite slight imperfections in the curved surfaces of the toroids or other imperfection of tolerances which occur during manufacturing procedures.

As a matter of orientation of the improvement constituting this invention it should be observed that the speed ratio change mechanism of the type to which this improvement is applicable generally employs a combination including opposed, grooved toroidal friction discs. These have interposed between them friction wheels or rollers which transmit the drive from one disc to its complementary and opposed disc. Such wheels or rollers ride in the toroidal grooves provided in each of the discs and thus transmit power through frictional force from one toroid to the other.

As well understood in the art, these referred to grooves which are formed in each of the opposed discs are annular grooves of circular cross-section, i.e., of even radius throughout, and formed in the opposed faces of the discs. The torque transmitting rollers interposed between discs are capable of movement in two different planes. By this angular adjustment, a variation in the sped ratio between the discs is obtained. For example, when the rollers are positioned right angularly with respect to the plane of rotation of the discs, the gear ratio is 1:1, whereas if the vertical disposition of the rollers is angularly deviated, the driving disc may drive the intermediate rollers nearer its circumference with such rollers contacting the driven disc nearer its axis of rotation. In the latter instance the result is to increase the speed ratio between the discs. But if the rollers are angularly deviated in an opposite direction, the same will contact the driving toroid nearer its axis of rotation and the driven toroid nearer its circumference. This will accomplish a reduced speed ratio.

Generally, a plurality of friction rollers are employed. The same are mounted not only for rotation about their axes for effecting drive, but as just suggested, are also mounted for a tilting movement in a plane almost coincident with the axis of rotation of the discs. In addition, they are supported for movement angularly to this axis for steering the discs. The latter "steering" movement results in the tilting effect through a "climbing" or "floating" responsive movement of the discs. It is this latter deviation which changes the drive ratio between the input and output toroidal friction discs.

A more detailed explanation of the mounting and controls for the intermediate rollers is found in the commonly owned application of John S. Jaquith, Edward P. Tomaszek and Leland R. Smith relating to Roll Positioning System for Toroidal Variable Ratio Transmissions, S.N. 789,929, filed January 29, 1959.

In transmission of this generally described type there is a definite problem in maintaining satisfactory pressure between the discs and the rollers. Also, because of the very nature of the mechanism, there is a variation in the load imposed with varying positions of the roller and with variation in the power transmitted.

Inasmuch as the contact between the toroidal surfaces and the rollers is a steel-to-steel contact with very small deflection on such contacts, it is therefore necessary to impose a relatively substantial axial pressure between the two discs to, in effect, squeeze the rollers between the two toroidal surfaces. At the same time, it is necessary that the discs have some resilience, but with this resilience the variation in axial pressure must be relatively small. Also, the contact pressure must be maintained without material variation with changed loads and with axial movement of the discs.

It is therefore a primary object of the present invention to provide a resilient connection to maintain the discs and rollers of a toroidal type transmission in contact with a near constant pressure, at all times over varying conditions which may be encountered in the drive, while still maintaining a desired resilience in the mechanism. This objective is obtained without losing the pressure necessary to produce frictional drive between the discs and the rollers, bearing in mind that the same have a steel-to-steel contact.

It is a further object of this invention to provide a resilient mounting which, by permitting limited deflection, substantially overcomes any minor inaccuracies of manufacture or assembly of the several rotating parts, and as well, protects such parts from overload.

It is another object of the invention to provide a resilient mounting of the described type which is adapted to take flexible loads while at the same time maintaining a constant, or near constant, axial load while the toroids deflect at various roller positions.

A further object of the invention is to provide such a resilient mount in conjunction with a telescopic bearing support, the latter constituting the axis for rotation of the opposed toroids, whereby the spring pressure tending to force such toroids together is uniformly imposed upon the contact surfaces of the intermediate driving rollers.

It is a final objective of the invention to provide such a resilient pressure device which attains more efficient and equal load sharing between the rollers with a corresponding increase in power transmissibility as well as a corresponding reduction in heat generation.

Other objects and advantages of the instant invention will be apparent from the following more detailed description and made with respect to the following drawings, wherein.

Figure 1:
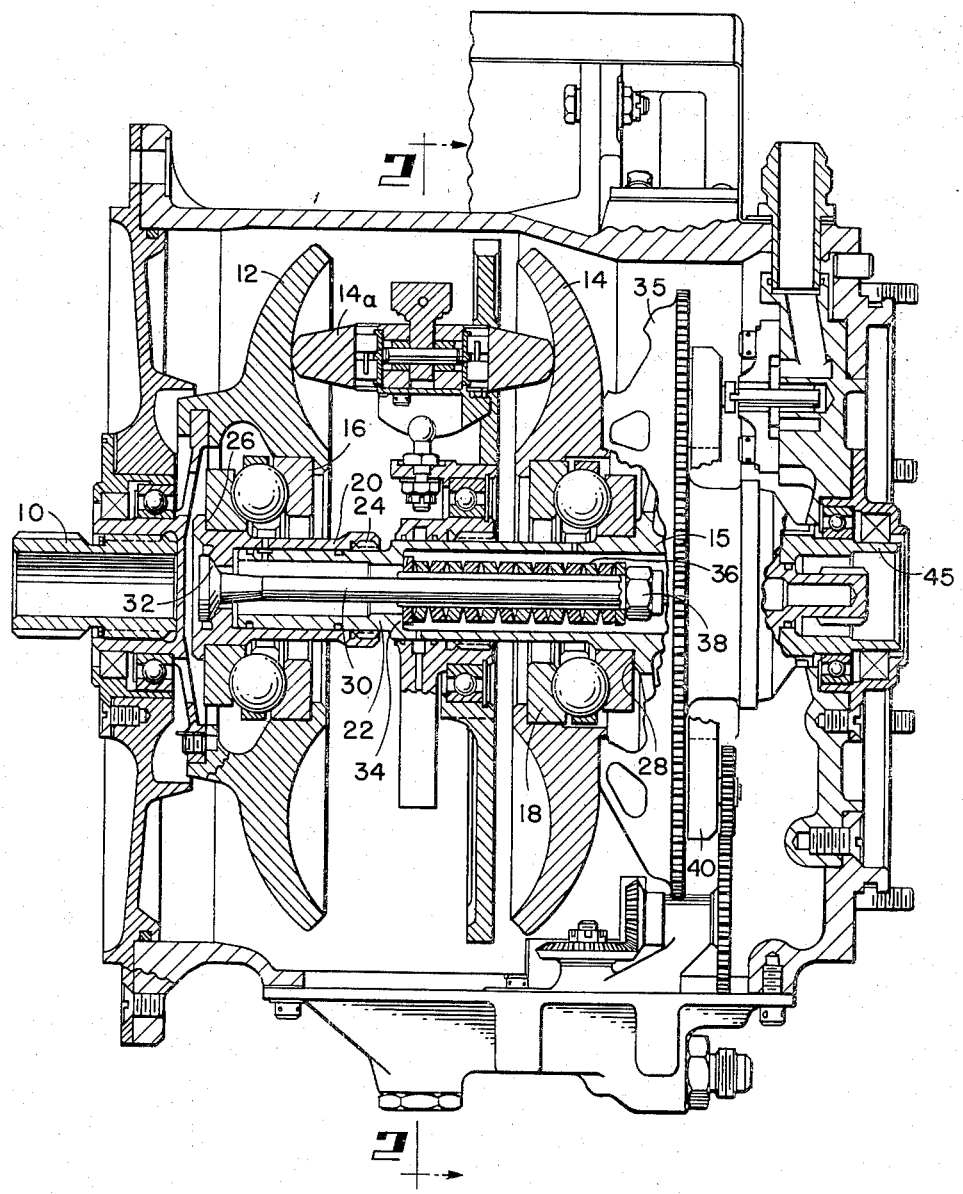
Figure 1 is a cross-section view longitudinally of the transmission showing an arrangement of the toroids, the drive roller, and the axial spring means, telescopically mounted, for exertion of constant and even pressure upon the intermediate rollers.

Referring more particularly to these drawings, it is seen that the input to the transmission is through shaft 10 which rotates the input toroid disc here designated at 12. The latter in turn transmits torque to an output toroid 14 through three intermediate rollers, 14a, 14b, and 14c. One of these rollers, 14a is shown in cross-section in Figure 1. All three rollers are shown in Figure 2.

The input toroid 12 is rotated by the shaft 10 to which it is suitably and fixedly connected. The output toroid 14 is secured to the shaft 15 and gear 35. Both toroids ride upon suitable thrust bearings. For example, input toroid 12 is mounted upon thrust bearings 16, while output toroid 14 is mounted upon thrust bearings 18.

From the foregoing it is seen that power is transmitted from the input shaft 10 to toroid 12 through the intermediate rollers, to output toroid 14 and thence to an appropriate gear train. The first gear 35 of this train is secured in any suitable manner to the output toroid 14. The gear 35 is arranged to drive a common form of gear reduction transmission such as a planetary gear arrangement generally indicated at 40. The various gear elements form no part of this invention, and are well known in this art, it being only necessary to point out that ultimately torque is delivered to the output shaft 45. The oil system for supplying oil to the toroidal discs and intermediate wheels is obtained through the various lines 50 which ultimately terminate in spouts 52 which feed directly into the path of the individual roller elements.

Both of the referred to bearings 16 and 18, as indicated above, are carried on a telescoping sectional shaft, the left portion 20 (viewing Figure 1) being in the region of the input toroid and the right portion 22 being predominantly in, and terminating in, the region of the output toroid. Both of these sections are splined together for limited axial movement relative to each other by spline connection 24, centrally located.

Figure 2:
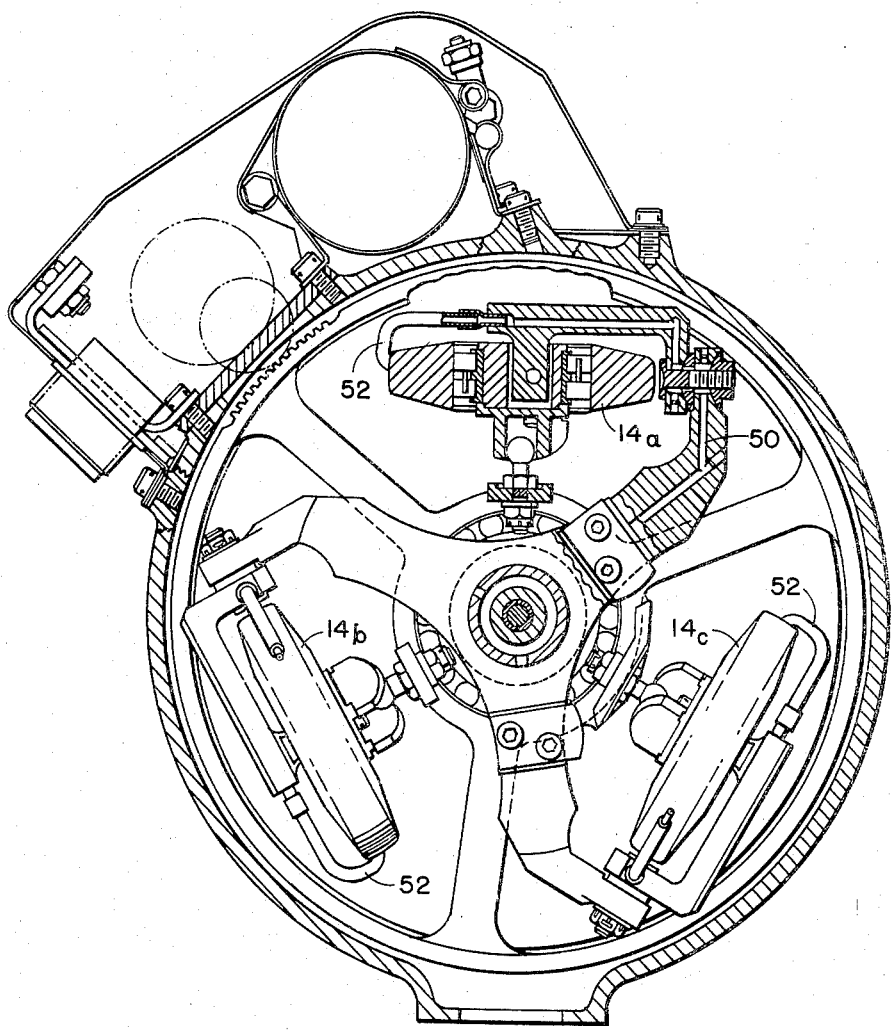
Figure 2 is a cross-section taken on the line 2—2 of Figure 1.

As shown in Figure 1 this sectional shaft is hollow and the two sections 20 and 22 are provided with suitable end abutments. Thus the portion 20 has abutment 26 and portion 22, abutment 28. In each instance the arrangement is such that these abutments embrace the outer ends of the respective thrust bearings 16 and 18. Hence, axial movement of the two portions 20 and 22 toward each other will resultantly force the opposed toroids 12 and 14 toward each other in relative axial movement along with the thrust bearings 16 and 18 which carry them.

With the hollow sections 20 and 22 being telescopically interfitted it is clear that the same are thus axially movable. Resilient compression of the opposed toroids upon opposite sides of the intervening rollers is obtained by means of a load bolt 30 having a boss or head 32 abutting against a correspondingly shaped depression in, and carrying, the telescoping shaft 20. This load bolt 30 also supports a series of coned discs 36 which are compressed together between an abutment 34 formed in shaft 22 and the nut 38 threaded upon the opposite end of the load bolt. In this manner, the series of coned discs 36 are compressed by the action of the nut 38 (which may be set or turned to the desired extent) to cause the load bolt 30, acting through the abutments 32 and 34, to resiliently compress and draw together the two telescoping axes 20 and 22. By this action, the two opposed toroids 12 and 14 are resiliently drawn together, consequently imposing a resilient, uniform and constant pressure upon the intervening drive rollers 14a, 14b, and 14c. The coned discs 36 afford the required amount of such resiliency, and may be fabricated, within the skill of the art, to be spring loaded to that extent to obtain the desired compressive force consistent with the required resiliency. The coned discs 36 are of the type known in the trade as coned disc springs and sometimes are referred to as "Belleville springs."

The discs when stacked in that type of series as shown—that is, with alternate coned shapes facing each other—thus provide an outward thrust or spring action of especial characteristics. This is because such a stacked arrangement of the coned discs imposes a constant or near constant load over a region of deflection afforded by the compression nut 38.

This type of spring arrangement affords a resilient mounting which tends to force the two toroids together against the rollers when under substantial load and where it is necessary to maintain adequate friction contact.

The instant combination is unique in that such stacked discs are utilized in conjunction with an axial, telescopic housing, the latter at the same time performing as the axis of rotation of the opposed toroids. In other words, this type of spring arrangement can be housed in the center of the sectional shafts 20—22 and in this position is adapted to exert a maximum evenness or uniformity of compressive action over the roller-contacting area of the toroids.

The location of this type of spring is particularly adapted for the conditions which are to be found in this type of drive mechanism, in that axial movement between the two toroids is relatively small, prohibiting the use of other, and more conventional types of spring loaded mechanisms. In other words, other types of the same necessarily require a substantial dimension. Such are not practical for the arrangement of the instant invention as inordinately sized springs are inadequate to achieve the objective outlined in the foregoing.

In the instant case the combination of the coned disc type spring which is comprised of a series of stacked coned washers, obtains the unique result of uniform, equal pressure throughout the area of the opposed toroids. A uniform load for the varying conditions of drive is thus obtained, and is of unique utility and advantage in this particular instance where the transmission ratio is subject to variation.

We claim:

1. In a variable speed power transmission of the character described, a mechanism for supporting and imposing load upon rollers carried between two toroidal discs, said toroidal discs being disposed in opposed parallel planes, comprising: a sectional hollow shaft having coaxial hollow sections telescoping inside the other and each of said sections carrying one of said toroidal discs for rotation; said hollow shafts lying substantially within said parallel planes, a load bolt extending through the hollow central portion of said sectional shaft; a plurality of coned disc springs surrounding said load bolt and providing a resilient connection imposing load on said toroidal discs, said disc springs lying substantially within said parallel planes, whereby said disc springs tend to push said discs toward each other with imposition of a constant and even load on said rollers.

2. In a toroidal variable ratio transmission, two toroidal discs having intermediate drive rollers therebetween, said toroidal discs being disposed in opposed parallel planes, said rollers having means to vary their angular disposition with respect to said discs to vary the gear ratio between said discs, means to impose load upon said rollers by resilient compression of said discs, said means comprising two hollow telescoping shafts supporting said discs, coned disc spring means within said shafts, said spring means being arranged to impose a resilient load upon said discs and said shafts, said hollow telescoping shafts and said springs being positioned substantially between said parallel planes, and means to adjust the amount of load exerted by said spring means.

3. In a toroidal variable ratio transmission, two toroidal discs having intermediate drive rollers therebetween, said toroidal discs being disposed in opposed parallel planes, said rollers having means to vary their angular disposition with respect to said discs to vary the gear ratio between said discs, means to impose load upon said rollers by resilient compression of said discs, said means comprising two hollow telescoping shafts, said telescoping shafts comprising the axis of rotation of said toroidal discs, one of said shafts supporting one of said discs, the other of said shafts supporting the other of said discs, axial spring means within said shafts, said spring means comprising a plurality of contacting coned discs, said spring means having a load bolt mounting arranged to impose a resilient load upon said discs and said shafts, said telescoping shafts and said spring means being located substantially within said parallel planes, and means to adjust the amount of load exerted by said spring means.

References Cited in the file of this patent

UNITED STATES PATENTS

| | | |
|---|---|---|
| 948,091 | Geer | Feb. 1, 1910 |
| 2,140,012 | Hayes | Dec. 13, 1938 |
| 2,830,469 | Billeter | Apr. 15, 1958 |